(12) United States Patent
Sumien

(10) Patent No.: US 11,991,195 B2
(45) Date of Patent: May 21, 2024

(54) REAL-TIME CYBERSECURITY MONITORING OF INFLIGHT ENTERTAINMENT SYSTEMS

(71) Applicant: Thales Avionics, Inc., Irvine, CA (US)

(72) Inventor: Arnaud Sumien, Mission Viejo, CA (US)

(73) Assignee: Thales Avionics, Inc., Irvine, CA (US)

( * ) Notice: Subject to any disclaimer, the term of this patent is extended or adjusted under 35 U.S.C. 154(b) by 329 days.

(21) Appl. No.: 17/469,465

(22) Filed: Sep. 8, 2021

(65) Prior Publication Data

US 2023/0070608 A1 Mar. 9, 2023

(51) Int. Cl.
  *H04L 9/40* (2022.01)
(52) U.S. Cl.
  CPC ................................ *H04L 63/1425* (2013.01)
(58) Field of Classification Search
  CPC ............. H04L 63/1425; H04L 63/1441; H04L 63/1408; H04L 63/1416; H04L 2209/84; G06F 21/55
  See application file for complete search history.

(56) References Cited

U.S. PATENT DOCUMENTS

| | | | | |
|---|---|---|---|---|
| 2003/0225492 A1* | 12/2003 | Cope | ...................... | G07C 5/008 |
| | | | | 701/14 |
| 2008/0177428 A1* | 7/2008 | Fok | ...................... | G08G 5/0082 |
| | | | | 701/3 |
| 2014/0230062 A1 | 8/2014 | Kumaran | | |
| 2015/0243112 A1* | 8/2015 | Jensen | ................. | G07C 5/0808 |
| | | | | 701/33.4 |
| 2016/0055685 A1* | 2/2016 | Lilly | .................... | G07C 5/0808 |
| | | | | 701/1 |
| 2017/0041331 A1* | 2/2017 | Craig | .................. | H04L 63/1441 |
| 2020/0076849 A1* | 3/2020 | Watson | ............... | H04W 12/128 |
| 2020/0178071 A1* | 6/2020 | Nguyen | ................ | H04L 63/107 |
| 2021/0014256 A1 | 1/2021 | Malhotra | | |
| 2021/0320928 A1* | 10/2021 | Stuck | .................. | H04L 63/1441 |

(Continued)

FOREIGN PATENT DOCUMENTS

CN 111488222 A 8/2020

OTHER PUBLICATIONS

Han et al., "Event-Triggered Interval-Based Anomaly Detection and Attack Identification Methods for an In-Vehicle Network," IEEE Transactions on Information Forensics and Security Year: 2021 | vol. 16 | Journal Article | Publisher: IEEE.*

(Continued)

*Primary Examiner* — Roderick Tolentino
(74) *Attorney, Agent, or Firm* — Sage Patent Group

(57) ABSTRACT

An aircraft-based inflight entertainment (IFE) security processing system is configured to receive log event streams from components of an IFE system and/or connected to the IFE system. The IFE security processing system aggregates content of the log event streams based on a level of aggregation set by aggregation commands received from a ground-based cybersecurity operations center to generate an aggregated log file, and communicates the aggregated log file through a satellite communication pathway to the ground-based cybersecurity operations center. Related ground-based cybersecurity operations centers are disclosed. Corresponding operations by cybersecurity operations centers are disclosed.

21 Claims, 9 Drawing Sheets

(56) References Cited

U.S. PATENT DOCUMENTS

2022/0030559 A1* 1/2022 Taherzadeh Boroujeni ................ H04L 5/0053
2022/0053466 A1* 2/2022 Taherzadeh Boroujeni ................ H04W 52/0229

OTHER PUBLICATIONS

Al-Jarrah et al., "Intrusion Detection Systems for Intra-Vehicle Networks: A Review," IEEE Access Year: 2019 | vol. 7 | Journal Article | Publisher: IEEE.*
International Search Report and Written Opinion of the International Searching Authority for PCT Application No. PCT/US22/42732 dated Feb. 2, 2023.

* cited by examiner

REAL-TIME CYBERSECURITY MONITORING OF INFLIGHT ENTERTAINMENT SYSTEMS

FIELD

The present disclosure relates to inflight entertainment systems and monitoring cybersecurity events related to operation of inflight entertainment systems.

BACKGROUND

Modern aircraft include a variety of electronic and computer systems to operate the aircraft and provide inflight entertainment (IFE) services to passengers. Aircraft typically include a satellite communications (SATCOM) system which enables aircraft systems to communicate through satellites and gateways with ground network nodes, such as content servers. Aircraft networks and systems can unexpectedly provide a conduit by which malicious entities, e.g., hackers, can attempt to gain unauthorized access to the onboard and offboard systems. In an attempt to prevent such unauthorize access, aircraft can employ various security controls, such as network firewalls, which attempt to control access to data networks and to prevent unauthorized access to critical and sensitive systems.

The security controls, however, do not provide an effective real-time operation for detecting, analyzing, and tracking attempted breaches or taking remedial actions. Conventional aircraft-based cybersecurity operations create raw event log files that record content of log event streams generated by aircraft systems. The raw event log files are accumulated during flight and then downloaded through a removable physical media that is transported off the aircraft by crew or are communicated through WiFi or cellular modem at an airport gate. Because of size of raw event log files it has been cost prohibitive to communicate raw event log files through the satellite communication pathway. There is therefore a need for methods and systems for providing real-time monitoring, analysis, detecting and track of attempted breaches and other security events arising with aircraft systems.

SUMMARY

Embodiments of the present disclosure are directed to providing an aircraft-based inflight entertainment (IFE) security processing system and ground-based cybersecurity operations center (CSOC) which enable real-time monitoring, analysis, detection, tracking, and remedial actions against attempted breaches and other security events arising with aircraft systems.

Some embodiments of the present disclosure are directed to the IFE security processing system which includes at least one processor and at least one memory storing instructions executable by the at least one processor to perform operations. The operations receive log event streams from components of an IFE system and/or which are connected to the IFE system. The operations aggregate content of the log event streams based on a level of aggregation set by aggregation commands received from the ground-based CSOC, to generate an aggregated log file. The aggregated log file is communicated through a satellite communication pathway to the ground-based CSOC.

Some other embodiments of the present disclosure are directed to the ground-based CSOC which includes at least one processor and at least one memory storing instructions executable by the at least one processor to perform operations. The operations receive an aggregated log file through a satellite communication pathway from the IFE security processing system. The operations process the aggregated log file to identify a security event satisfying at least one defined security rule. Responsive to identifying the security event, the operations generate an aggregation command to control aggregation by the IFE security processing system of content of log event streams from components of an IFE system to generate an updated aggregated log file. The operations communicate the aggregation command through the satellite communication pathway to the IFE security processing system.

Some further embodiments are directed to the CSOC controlling the IFE security processing system's correlation of content of the log event streams based on a correlation rule having parameters defined based on correlation commands received from the ground-based cybersecurity operations center. In one embodiment, the CSOC controls the time interval over which content of individual ones of the log event streams are correlated to generate the aggregated log file to be reported to the CSOC. In another embodiment, the CSOC controls a level of aggregation performed by the IFE security processing system on content of a raw log file which stores content of log event streams.

Other aircraft-based IFE security processing systems and ground-based control CSOCs, and related methods, and computer program products according to embodiments of the inventive subject matter will be or become apparent to one with skill in the art upon review of the following drawings and detailed description. It is intended that all such additional aircraft-based IFE security processing systems and ground-based control CSOCs, and related methods, and computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present or used in another embodiment.

Figure 1:
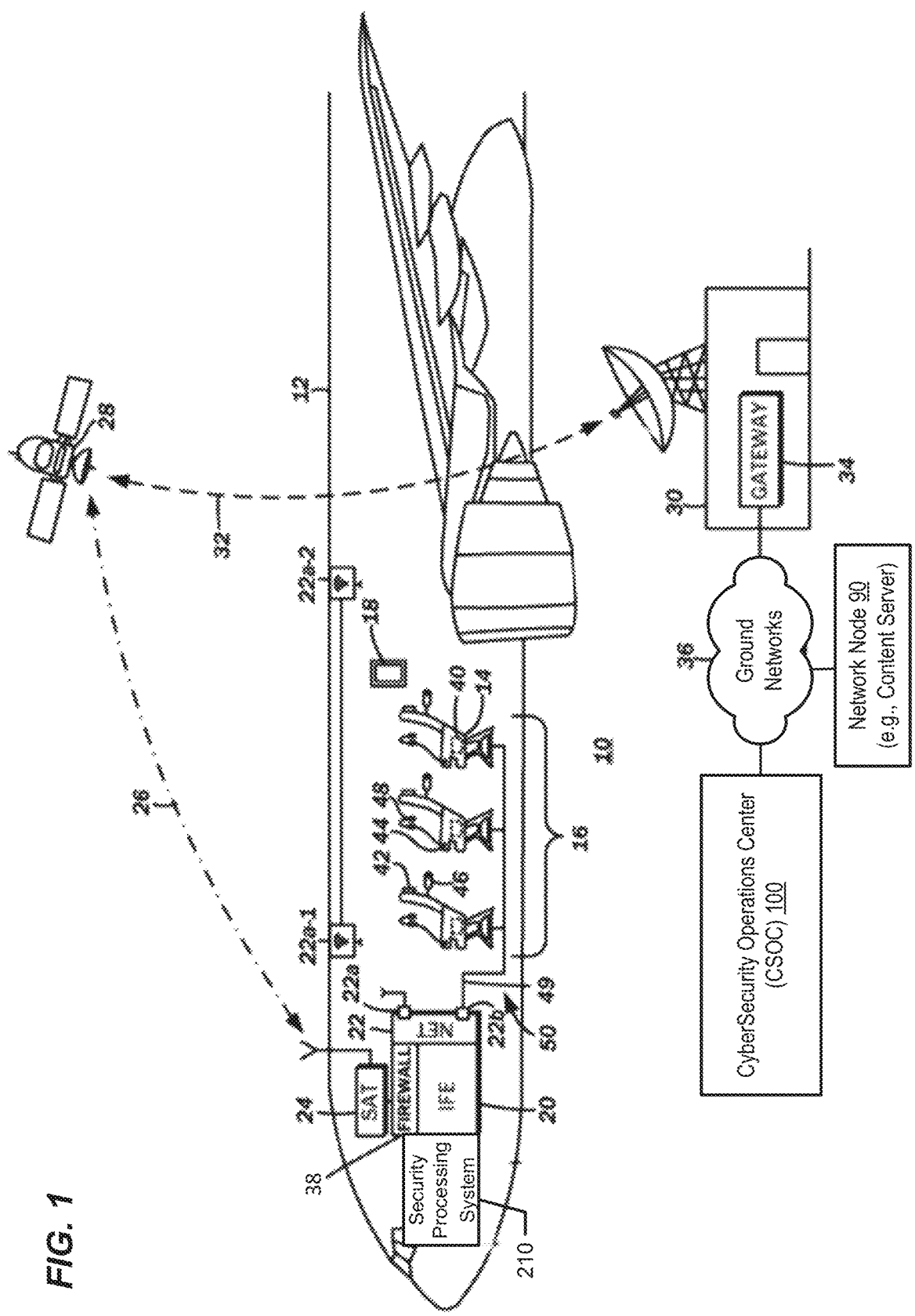
FIG. 1 illustrates example component systems of an aircraft which includes an IFE security processing system that communicates through a satellite network with a ground-based cybersecurity operations center in accordance with some embodiments of the present disclosure.

FIG. 1 illustrates example component systems of an aircraft which includes an IFE security processing system which communicates through a satellite network with a ground-based cybersecurity operations center (CSOC) in accordance with some embodiments of the present disclosure. Within a fuselage 12 of the aircraft 10, there may be seats 14 arranged over multiple rows 16, with each seat 14 accommodating a single passenger. One or more passengers may utilize a portable electronic device (PED) 18 during flight. Example PEDs 18 include smart phones, tablet computers, laptop computers, and other devices that include a processor which executes pre-programmed instructions (e.g., user applications). Although these PEDs are most often brought on board the aircraft 10 by the passengers themselves, airline carriers may also offer them to the passengers for temporary use.

The aircraft 10 incorporates an inflight entertainment and communications (IFE) server 20. One of its components is a data communications network 22. Almost all conventional PEDs 18 have a WLAN (WiFi) module, so the network 22 of the IFE system 20 includes WLAN access points 22a, 22a-1 and 22a-2 spaced apart within the fuselage 12 and connected to the data communications network 22 via, e.g., a wired network such as wired Ethernet. The PED 18, via the onboard WLAN network, may connect to the IFE system 20 to access various services offered thereon such as content downloading/viewing, shopping, and so forth.

The IFE server 20 (also referred to as "IFE system") may also offer Internet access to the connecting PEDs 18. One contemplated modality that operates with the IFE server 20 is a satellite communication transceiver 24 that establishes and maintains a broadband data communications link 26 with a communications satellite 28. The link 26 may use Ku-band microwave transmissions. However, any suitable communications satellite 28, such as Inmarsat or Iridium may also be utilized without departing from the present disclosure including other bands, such as Ka-band, C-band and/or X-band. The communications satellite 28 maintains a broadband data communications link 32 with a satellite gateway 30 operated by a communications service provider 30. Bidirectional broadband data communications are performed between the aircraft satellite communication transceiver 24 and the ground satellite gateway 34 via the links 26 and 32. The ground satellite gateway 34 is connected to ground networks 36, such as the Internet and/or private networks. There are numerous types of network nodes 90, e.g., content servers, that are accessible to passengers via the IFE server 20 connected to the satellite 28 and gateway 34. Satellite communication links are a relatively expensive pathway for data traffic.

The PED 18 can connect to the IFE server 20 via one of the WLAN access points 22a, 22a-1, 22a-2 which relays the data transmissions to the satellite communication transceiver 24 for transmission to the communications satellite 28 over the data link 26, and the satellite 28 relays the data to the gateway 34 over the data link 32. The network gateway 34 then routes the transmission to the ground networks 36, e.g., Internet. Data transmissions from network nodes(s) 90 on the Internet to the PED 18 are understood to follow a reverse pathway. Due to the high costs associated with the communications satellite 28 that is passed to the users of the satellite communications, the carrier may use a firewall with limits data traffic to and from the satellite communication transceiver 24 with a firewall 38.

Another way in which the passenger can utilize the services offered through the IFE server 20 are individual seat-based equipment which can include a terminal unit 40, a display (e.g., seat video display unit) 42, an audio output 44, and a remote controller (e.g., passenger control unit) 46. For a given row 16 of seats 14, the terminal unit 40 and the audio output 44 are disposed on the seat 14 for which it is provided, but the display 42 and the remote controller 46 may be disposed on the row 16 in front of the seat 14 to which it is provided. For example, the display 42 and the remote controller 46 can be installed on the seatback of the row in front of the seat. This is by way of example only, and other display 42 and remote controller 46 mounting and access configurations such as a retractable arm or the like mounted to an armrest of the seat 14 or by mounting on a bulkhead.

Each passenger can utilize an individual headset 48, supplied by either the airline or by the passenger, which provides a more private listening experience. In the illustrated embodiment, the audio output 44 is a headphone jack that is a standard ring/tip/sleeve socket. The headphone jack may be proximately located to the display 42 or on the armrest of the seat 14 as shown. The headphone jack may be an active type with noise canceling and including two or three sockets or a standard audio output without noise canceling. Alternatively, short-range wireless communication devices such as Bluetooth transceivers may be provided to connect the headset 48 to the terminal unit 40 and/or the display 42. In alternate embodiments, each display 42 may incorporate a terminal unit 40 to form a display unit (e.g., smart monitor).

A common use for the terminal unit 40 installed on the aircraft is the playback of various multimedia content. The terminal unit 40 includes at least one processor configured to decode the data files corresponding to the multimedia content and generates video and audio signals for the display 42 and the audio output 44, respectively. Multimedia content data files may be stored in one or more repositories associated with the IFE server 20, and each of the terminal units 40 for each seat 14 may be connected thereto over a wired local area network link 49 connected to a wired network interface 22b, e.g., Ethernet switch or router, or via the WLAN access points 22a, 22a-1, 22a-2.

In some embodiments, the terminal units 40 initiate a request for multimedia content to the IFE server 20, where such content may be stored. The data is transmitted to requesting terminal unit 40 over the wired local area network link 49, and most data traffic thus remains local. The terminal units 40 may additionally receive content that is streamed (e.g., IPTV) from one of a content server of one of the ground network nodes 90 through the satellite 28 and temporarily buffered by the IFE server 20. There are several additional applications contemplated that may rely upon a connection to the ground networks 36, in which case the data is passed to the satellite communication transceiver 24 so long as permission has been granted therefor by the firewall 38 in the same manner as described above in relation to the WLAN network and the request originating from the PED 18.

Although it is generally assumed that passengers use the onboard systems without malicious-intent, it is foreseeable that a passenger may attempt to access restricted content and/or services for malicious purposes such as obtaining sensitive data (e.g., other passenger login credentials, credit card information, etc.) and disrupting and/or taking control over those services. Moreover, a passenger may attempt to interfere with operation of components of the aircraft systems, such as through a denial of service attack of the WLAN access points 22a, 22a-1 and 22a-2, the wired network 49, etc. Flight-critical avionics systems are physically and logically separated from the onboard local area network 50 carrying passenger data traffic, although some avionics systems may utilize the onboard local area network 50 for operational, administrative, and/or maintenance purposes. Whether done for financial profit or for malicious purpose, attacks against components connected to the onboard local area network 50 are problematic for carriers.

Various embodiments of the present disclosure are directed to enabling real-time monitoring, analysis, detection, tracking, and remedial actions against attempted breaches and other security events arising with aircraft systems using an aircraft-based IFE security processing system 210 which operates to control the amount of data traffic communicated to a ground-based cybersecurity operations center (CSOC) 100 through the satellite 28 and gateway 34. As will be explained in further detail below, the ground-based CSOC 100 controls aggregation and correlations operations performed by the aircraft-based IFE security processing system 210 on content of log event streams from components of the aircraft system 200, when generating aggregated log files to be reported to the CSOC 100. The amount of aggregation and correlation is performed when generating the aggregated log files can be dynamically adapted by the aircraft-based IFE security processing system 210 based on commands from the ground-based CSOC 100 so that cost-effective and timely utilization of the satellite communication pathway is performed. For example, while a security event is not detected the content and frequency of reporting of aggregated log files can be reduced. In sharp contrast, when a security event is detected the content and frequency of reporting of aggregated log files can be increased to enable the ground-based CSOC 100 to more accurately identify a possible root cause of the security event and to responsive determine a remedial action that is commanded for the aircraft-based IFE security processing system 210 to perform.

For example, the aircraft-based IFE security processing system 210 can aggregate content of log event streams from components of the aircraft system 200 based on a level of aggregation set by aggregation commands received from the ground-based CSOC 100, to generate an aggregation log file which is reported to the ground-based CSOC 100. The aircraft-based IFE security processing system 210 may be configured with a default level of aggregation which can be overridden by received aggregation commands. The aircraft-based IFE security processing system 210 can also correlate content of the log event streams based on a correlation rule having parameters defined based on correlation commands received from the ground-based cybersecurity operations center. The CSOC 100 can monitor the reported aggregation log files to identify occurrence of a security event, and responsively adapt the aggregation and/or correlation operations by the aircraft-based IFE security processing system 210 to enable enhanced analysis of updated aggregation log file received therefrom. The CSOC 100 may additionally identify and send remedial security action commands to the aircraft-based IFE security processing system 210 to counteract the attempted breach or other security events arising with one or more of the aircraft systems.

Figure 9:
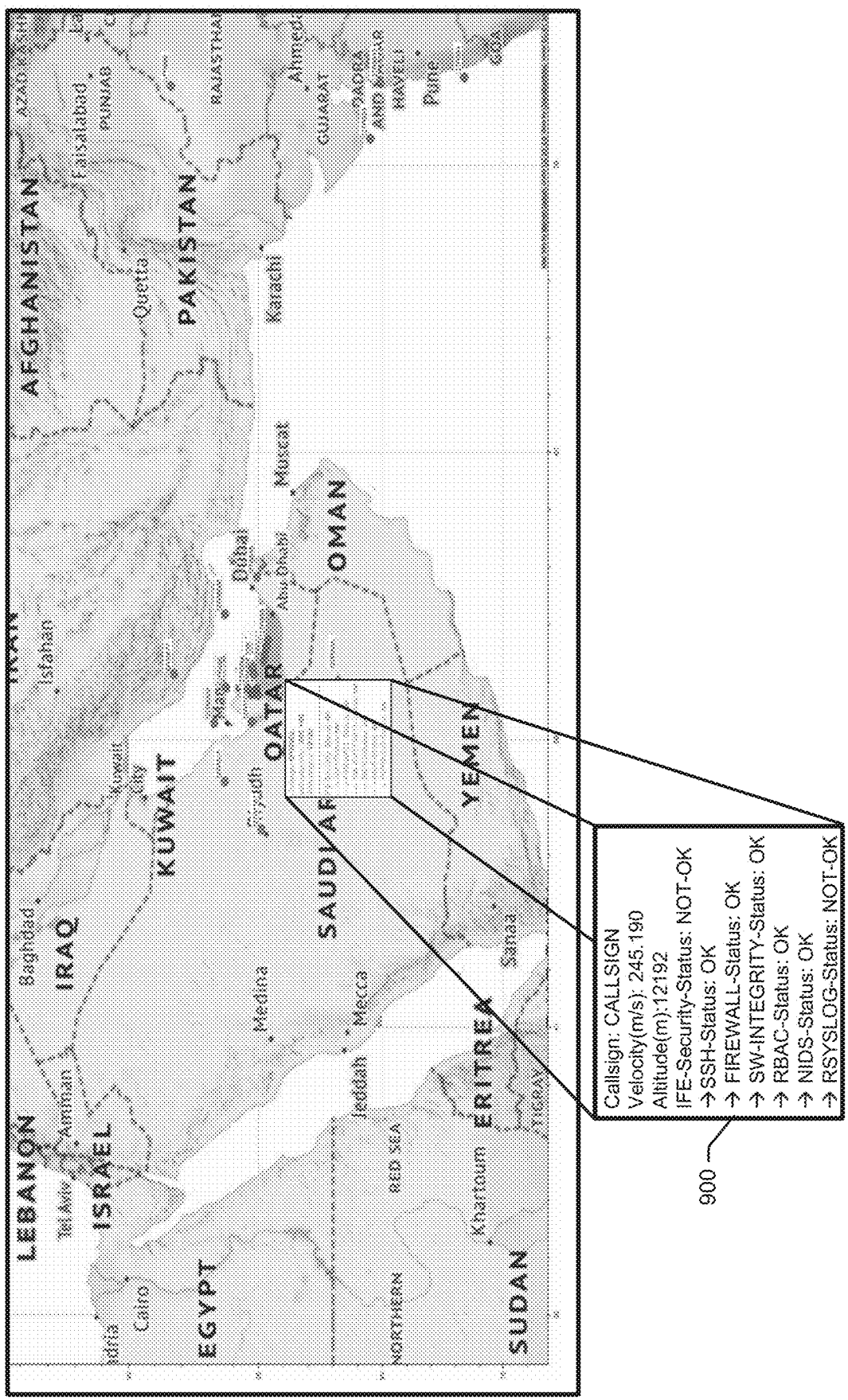
FIG. 9 illustrates an example computer generated display layout by the ground-based CSOC which shows a geographic map with an overlaid security related notification for an inflight aircraft in accordance with some embodiments of the present disclosure.

FIG. 9 illustrates an example computer generated display layout by the ground-based CSOC 100 which shows a geographic map with an overlaid security related notification 900 for an inflight aircraft which is displayed in accordance with some embodiments of the present disclosure. The security related notification 900 indicates the aircraft's callsign, velocity, altitude, and IFE security status. For the illustrated example, the IFE security status is "NOT-OK" due to the CSOC 100 identifying that content of aggregated log file received from the aircraft satisfies a security event rule. In particular, the RSYSLOG-status is determined to be "NOT-OK" (i.e., indicating detection of a security event) while the SSH-Status, Firewall-status, SW-Integrity-Status, RBAC-Status, and Network Intrusion Detection System (NIDS)-status are each "OK".

The ground-based CSOC 100 can receive aggregation log files from an associated fleet of operating aircraft and can display security statuses that are periodically updated based on analysis of updated aggregation log files from each of the aircraft. An human operator can thereby visually observe the security statuses and, when a problematic security event arises, can assist with identifying a root cause of the security event and determining a remedial action that should be taken by the IFE security processing system of the affected aircraft. Different colors and/or other indicia may be used to visually indicate which, if any aircraft are possibly experiencing a security event.

The CSOC 100 can operate to cross correlate content of aggregation log files received from one aircraft against content of aggregation log files received from other aircraft, such as aircraft operating in a same geographic region, same flight phase, etc. Enabling cross-correlation between the aggregation log files of different aircraft can enable the ground-based CSOC 100 to more accurately detect occurrence of security events. For example, satellite link communication errors reported in aggregation log files from a first aircraft may be determined by the CSOC 100 to have a root cause that is outside the first aircraft based on determining that a second aircraft served by a same satellite relay is experiencing similar communication errors. Similarly, communication errors with a particular ground-based network node (e.g., content server) reported in aggregation log files from a first aircraft may be determined by the CSOC 100 to have a root cause that is outside the first aircraft based on determining that a second aircraft is experiencing similar communication errors with the same ground-based network node or determining that both aircraft are communicating through a same or similar ground network 36 pathway which is experiencing communication problems.

Figure 10:
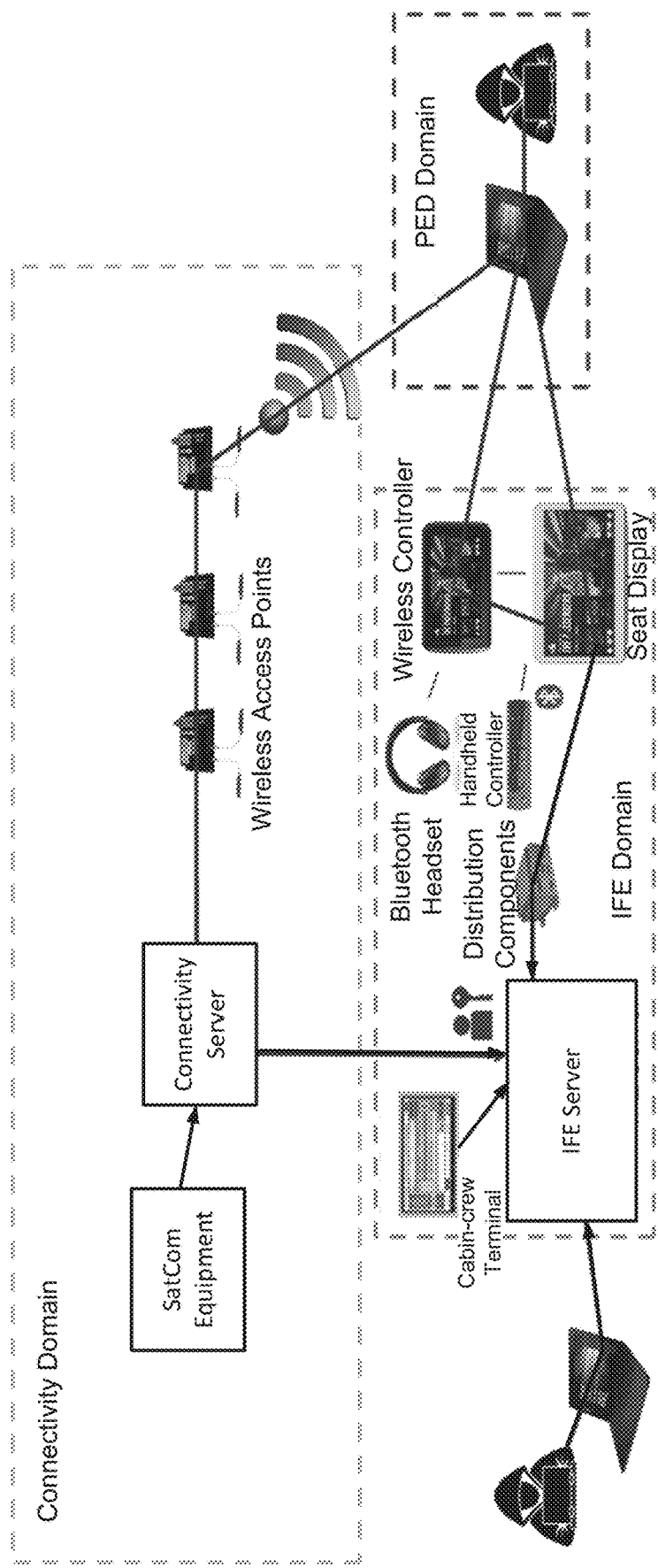
FIG. 10 illustrates example attack scenarios that can be detected and reported in real-time by the aircraft-based IFE security processing system to the ground-based CSOC through the satellite communication pathway in accordance with some embodiments of the present disclosure.

FIG. 10 illustrates example attack scenarios that can be detected and reported in real-time by the aircraft-based IFE security processing system 210 to the ground-based CSOC 100 through the satellite networks in accordance with some embodiments of the present disclosure.

Referring to FIG. 10, one attack scenario which is illustrated includes where an attacker is attempting to gain unauthorized access to the IFE server. In one approach, the attacker attempts to connect a PED to the IFE server via an Ethernet interface, a USB interface, and/or another interface or communication port of the IFE server, to gain unauthorized access to content and/or a service of the IFE server. If the attacker is successful at gaining unauthorized access to the IFE server, the attacker may deploy malicious software which is configured to report to the attacker other passenger credentials (e.g., bank account login credentials, stream service login credentials, etc.), crew access credentials, credit card information, and other sensitive information. In another approach, the attacker attempts to connect the PED to the IFE server via WiFi communications through the aircraft wireless access points which communicate through a connectivity server with the IFE server. In still another approach, the attacker attempts to connect the PED to the IFE server via WiFi and/or Bluetooth communications through a wireless controller and/or a seat display that is networked through distribution components to the IFE server. In still another approach, the attacker attempts to obtain unauthorized access to the IFE server through a cabin terminal which is configured for restricted crew control of the services provided by the IFE server.

In accordance with various embodiments of the present disclosure, each of the connectivity domain components and IFE domain components can include a security log event reporting module which generates log event streams to the IFE security processing system 210 (FIG. 1) reporting, for example, user access attempts and reporting associated device identifiers and user credentials that were submitted for authentication in an unsuccessful attempt to gain access to components and/or that were submitted in a successful attempt to gain access to components.

In another attack scenario, the attacker is performing a network scan of data and/or control messaging traffic in-flight between other passenger PEDs and the WiFi and/or Bluetooth wireless access points. The security log event reporting modules of the WLAN access points, the connectivity server, the wireless controller, and/or the seat display can be configured to monitor and report observed SSIDs, SSH (secure shell protocol) activity, and/or other transmissions by or to wireless components of the connectivity domain and the IFE domain. For example, if the attacker configures the PED to spoof the SSID of the wireless access points in an attempt to create a man-in-the-middle attack between the wireless access points and another passenger's PED, the IFE security processing system 210 may be able to identify occurrence of the man-in-the-middle attack based on processing content of the log event streams and/or the CSOC 100 may be able to identify occurrence of the man-in-the-middle attack based on processing content of the aggregated log file received from the IFE security processing system 210.

In still another attack scenario, the attacker is attempting to access ports of the IFE server, restricted content stored on the IFE server, and/or restricted services provided by the IFE server. The firewall 40 can block the attempts while a security log event reporting module associated with the firewall 40 logs information associated with the attempts for security event identification by the IFE security processing system 210 based on processing content of the log event streams and/or for security event identification by the CSOC 100 based on processing content of the aggregated log file received from the IFE security processing system 210.

Figure 2:
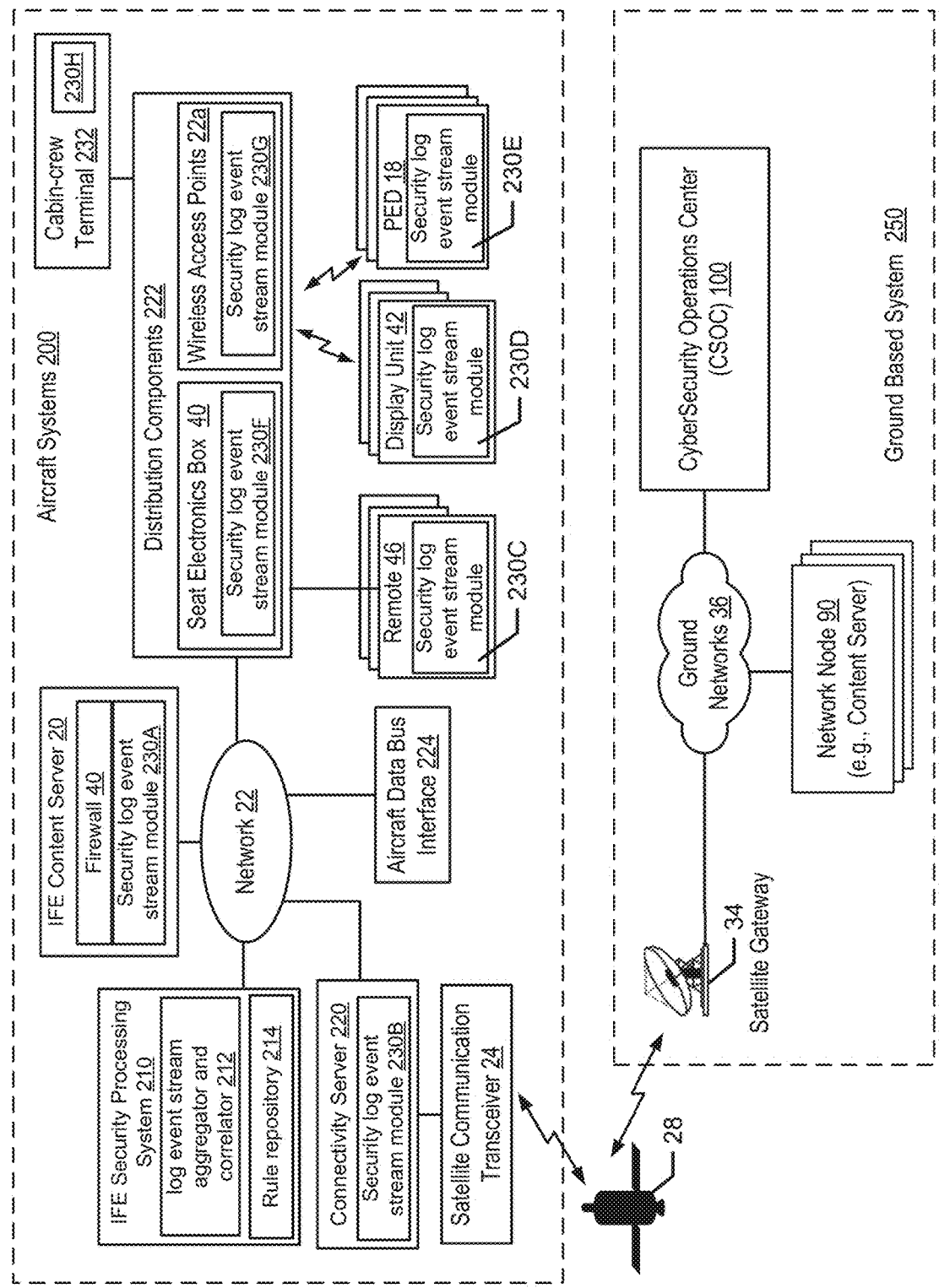
FIG. 2 illustrates a further block diagram of the aircraft systems and the ground-based cybersecurity operations center of FIG. 1 which are configured according to some embodiments of the present disclosure.

FIG. 2 illustrates a further block diagram of the aircraft systems 200 and the ground-based cybersecurity operations center 250 of FIG. 1 which are configured according to some embodiments of the present disclosure.

Referring to FIG. 2, the aircraft system 200 includes example content delivery devices, such as display units (video display units) 42 and an IFE content server 20, a connectivity server 220, a satellite communication transceiver 24, an aircraft data bus interface 224, and data traffic distribution components 222. Passenger electronic devices ("PEDs") 18 may be passenger owned devices and/or owned by airlines and provided for temporary use by passengers during the duration of a flight. The distribution components 222 communicatively connect service delivery devices, such as the display units 42 and PEDs 18, to other components of the aircraft system 200 through wired communication connections provided by seat electronic boxes 40 (e.g., each mounted to a row of seats) and/or through wireless communication connections provided by wireless access points 22a which can be spaced apart along the aircraft cabin. Ground-based computer systems 250 which include various network nodes 90 (e.g., Internet website content servers, airline content servers, etc.) can communicate through ground-based networks 36 (e.g., Internet and/or private networks) the satellite gateway 34 and satellite 28 with the aircraft system 200. Passengers receive content from and may be enabled to communicate with various of the network nodes 90 through the display units 42 and/or the PEDs 18 to browse websites, stream movies, play games, access files, and perform other operations provided by the various network nodes 90.

Example content that can be streamed from the IFE content server 20 can include, but is not limited to, movies, TV shows, audio programs, application programs (e.g. games, news, etc.), informational videos and/or multimedia/textual descriptions (e.g., news, advertisements, and information related to inflight services, destination cites, destination related services, and products). The wireless access points 22a may be WIFI access points (e.g. IEEE 802.11, etc.), Bluetooth transceivers, cellular-based access points (e.g. a pico cell radio base station), etc.

The display units 42, the PEDs 18, and/or the remote controllers (passenger control units) 46 can be configured to request and receive content from the IFE content server 20 through wired and/or wireless network connections through the network 22 and/or the distribution components 222. Any number of display units 42, PEDs 18, and remote controllers (passenger control units) 46 may be used with embodiments herein.

In accordance with various embodiments disclosed herein, the aircraft systems 200 include an IFE security processing system 210 having at least one processor and at least one memory storing instructions executable by the at least one processor to perform operations including to receive log event streams from security log event stream modules integrated in various components of the aircraft system 200 and/or connected to the aircraft system 200. In the illustrated example of FIG. 2, a security log event stream generator 230A generates a log event stream based on log events triggered by a firewall 40 connected to the IFE content server 20, and communicates the log event stream to the IFE security processing system 210. Another security log event stream generator 230B generates a log event stream based on log events triggered by a connectivity server 220, which controls communications between components of the aircraft system 200 communicating through the network 22 and the satellite communication transceiver 24, and communicates the log event stream to the IFE security processing system 210. Other security log event stream generators 230C-230E each generate a log event stream based on log events triggered by the remote 46, the display unit 42, and the PED 18, respectively, and communicate the log event stream to the IFE security processing system 210. Other security log event stream generators 230F and 230G each generate a log event stream based on log events triggered by the seat electronics box 40 and the wireless access points 22a, respectively, and communicate the log event stream to the IFE security processing system 210. Another security log event stream generator 230H generates a log event stream based on log events observed or triggered by the cabin-crew terminal 232.

The IFE security processing system 212 operates to aggregate content of the log event streams based on a level of aggregation set by aggregation commands received from a ground-based cybersecurity operations center, to generate an aggregated log file. The aircraft-based IFE security processing system 210 may be configured with a default level of aggregation which can be overridden by received aggregation commands. The IFE security processing system 212 further operates to communicate the aggregated log file through a satellite communication pathway to the ground-based CSOC 100. The aggregation and correlation operations may be performed by a log event stream aggregator and correlator 212. The IFE security processing system 212 may also include a rules repository 214 which is explained further below.

Figure 3:
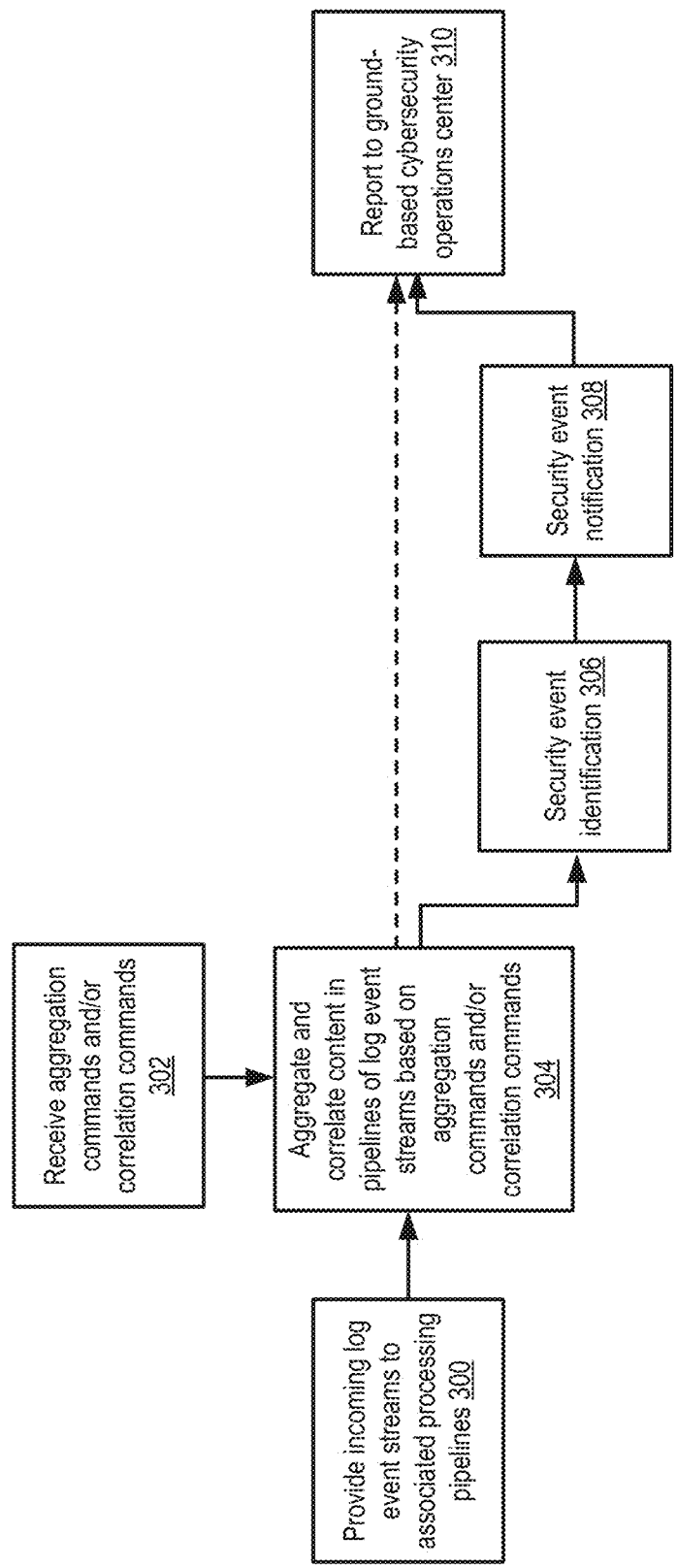
FIG. 3 illustrates a block diagram of processing operations performed by the aircraft-based IFE security processing system on incoming log event streams to report to the ground-based CSOC of FIGS. 1 and 2 in accordance with some embodiments of the present disclosure.

FIG. 3 illustrates a block diagram of processing operations performed by the aircraft-based IFE security processing system 210 on incoming log event streams to report to the ground-based CSOC 100 of FIGS. 1 and 2 in accordance with some embodiments of the present disclosure.

Referring to FIG. 3, incoming log event streams are provided 300 to associated processing pipelines for separate aggregation, separate correlation, and/or possible cross-correlation between pipelines. The incoming log event streams may be stored in data structures in memory with logical associations to the respective logical pipelines for retrieval and processing by one or more processors of the IFE security processing system 210. Aggregation commands and/or correlation commands are received 302 from the CSOC 100. Aggregation and correlation of content in the pipelines of log event streams is performed 304 based on the received aggregation commands and/or correlation commands, which can generate updated aggregated log files that are reported 310 periodically and/or upon request to the CSOC 100. Alternatively or additionally, operations may process the aggregated and/or correlated log file to identify a security event satisfying at least one defined security rule, e.g., in the rules repository 214, and responsively trigger generation of a security event notification 308 which is reported 310 to the CSOC 100. These and other operations are explained in further detail below in accordance with various embodiments of the present disclosure.

Some operations of the IFE security processing system 210 may be based on functionality of Graylog management software, by Graylog Corp, to perform aggregation and/or correlation of content of the log event streams to generate aggregated log file. Graylog management software may additionally or alternatively be used to identify occurrence of a security event based on content of the area log file. Graylog management software is an open-source software capable of performing correlation operations on log event streams and enabling definition of security alert triggering rules. In accordance with various embodiments herein, the aggregation and/or correlation of content of the log event streams is performed responsive to aggregation commands received from the ground-based CSOC 100, which are generated based on analysis of one or more aggregation log files earlier received from the same IFE security processing system and/or a set of IFE security processing systems distributed across a set of aircraft.

Figure 4:
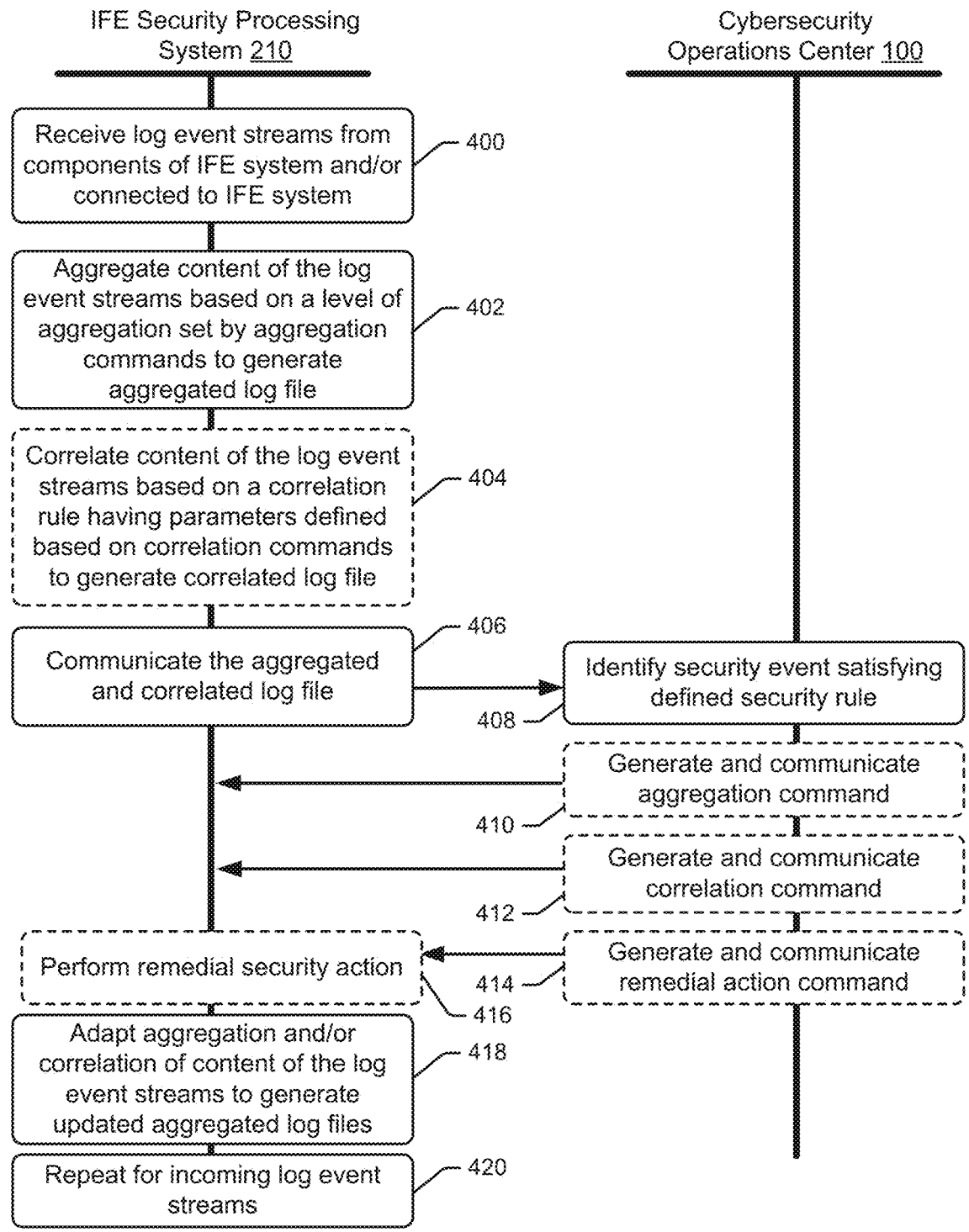
FIG. 4 illustrates a data flow diagram and operations by the aircraft-based IFE security processing system and the ground-based CSOC in accordance with some embodiments of the present disclosure.

FIG. 4 illustrates a data flow diagram and operations by the aircraft-based IFE security processing system 210 and the ground-based CSOC 100 in accordance with some embodiments of the present disclosure.

Referring to FIG. 4, the IFE security processing system 210 receives 400 log event streams from components of the aircraft system 200, and aggregates 402 content of the log event streams based on a level of aggregation set by aggregation commands received from the ground-based CSOC 100, to generate an aggregated log file. The IFE security processing system 210 may also correlate 404 content of the log event streams based on a correlation rule having parameters defined based on correlation commands received from the ground-based CSOC 100. The operations then communicate 406 the aggregated and possibly also correlated log file to the ground-based CSOC 100.

The components from which the IFE security processing system 210 can receive log event streams can include, without limitation, a network intrusion detection system, a role-based access control system, a secure shell (SSH) protocol module, antivirus software, access point rouge detection logs, firewall, user authentication services, software integrity monitoring services, network intrusion detection services, etc. Various of these components may be hosted on any one or more of the aircraft systems 200 shown in FIG. 2, including without limitation: a network interface security unit; an IFE content server; a connectivity server; an interactive cabin management terminal; a seat video display unit; a touch passenger media unit; a wireless access point; a seat electronics box; a PED; and other components described above for the aircraft systems 200 of FIG. 2.

In some further embodiments, the operation to correlate 404 content of the log event streams based on the correlation rule having parameters defined based on the correlation commands received from the CSOC 100, includes to correlate content of individual ones of the log event streams over a time interval that is defined by the correlation commands received from the CSOC 100, to generate the aggregated log file with the correlated content. The operation to correlate content of individual ones of the log event streams over a time interval that is defined by the correlation commands, may include to receive first and second correlation commands. The first correlation command requests correlation of a first group of log event streams over a first time interval and the second correlation command requests correlation of content of a second group of log event streams, where the first time interval is different than the second time interval, and the first group of log event streams contains at least some different log event streams than the second group of log event streams. The operations correlate content of individual ones of the log event streams in the first group over the first time interval, and correlate content of individual ones of the log event streams in the second group over the second time interval.

In some further embodiments, the operation to correlate 404 content of the log event streams based on the correlation rule having parameters defined based on the correlation commands received from the CSOC 100, includes to select a group of the log event streams which are identified by the correlation commands received from the ground-based cybersecurity operations center. The operations then correlate between content of the selected group of the log event streams to generate a correlation content file characterizing similarities and/or differences between the content of the selected group of the log event streams which are indicative of a cybersecurity event occurring, and communicate the correlated content file through the satellite communication pathway to the ground-based cybersecurity operations center. For example, log event streams from the wireless access points 22a can be cross-correlated to identify a pattern of failed access attempts observed across different ones of the wireless access points 22a from requests from a same identified PED.

The ground-based CSOC 100 includes at least one processor and at least one memory storing instructions executable by the at least one processor to perform operations. The operation include to receive the aggregated log file through a satellite communication pathway from the IFE security processing system 210, and to process the aggregated log file to identify 408 a security event satisfying at least one defined security rule. The operations respond to identifying 408 the security event, by generating 410 an aggregation command which is communicated through the satellite communication pathway to the IFE security processing system 210 to control aggregation by the IFE security processing system 210 of content of log event streams from components of the aircraft system 200 to generate an updated aggregated log file.

In a further embodiment, the ground-based CSOC 100 operates to respond to identifying 408 the security event, by determining 412 a time interval over which the IFE security processing system 210 is to perform periodic aggregation of content of the log event streams to generate updated aggregated log files, and communicating 412 the determined time interval in a correlation command that controls correlation by the IFE security processing system 210 of content of individual ones of the log event streams.

In a further embodiment, the ground-based CSOC 100 operates to respond to identifying 408 the security event, by selecting 412 a group of the log event streams in which the IFE security processing system is to perform aggregation of content to generate the updated aggregated log file, and communicating 412 the selected group of the log event streams in a correlation command that controls correlation by the IFE security processing system 210 of content of selected group of the log event streams.

In a further embodiment, the ground-based CSOC 100 operates to respond to identifying 408 the security event, by generating 410 the aggregation command to request a defined level of aggregation of content of the log event streams by the IFE security processing system 210 processing content of a raw log file using an aggregation algorithm operationally controlled by the defined level of aggregation to generate the updated aggregated log file, and communicating the aggregation command through the satellite communication pathway to the IFE security processing system 210. Thus, for example, the CSOC 100 can respond to identifying a possible security event occurring in a particular component (e.g., connectivity server 220) of the aircraft systems 200, by sending a command to the IFE security processing system 210 instructing for a greater quantity of content (e.g., less aggregation of the content) in the log event stream from that particular component be included in the aggregated log file. The CSOC 100 may, for example, command the IFE security processing system 210 to begin storing non-aggregated raw content of the log event stream from the particular component into the area log file that is communicated to the CSOC 100, which can enable more detailed further analysis by the CSOC 100 to identify a possible root cause of the security event and determine an associated remedial action is to be performed by the IFE security processing system 210.

In a further embodiment, the ground-based CSOC 100 operates to respond to identifying 408 a first security event associated with a first group of log event streams that satisfies a first security rule, by generating 410 a first aggregation command requesting a first level of aggregation of content of a first group of log event streams by the IFE security processing system, and communicating the first aggregation command through the satellite communication pathway to the IFE security processing system 210. Following communication of the first aggregation command and responsive to identifying 408 a second security event associated with a second group of log event streams that satisfies a second security rule, the operations generate 410 a second aggregation command requesting a second level of aggregation of content of a second group of log event streams by the IFE security processing system 210, and communicate the second aggregation command through the satellite communication pathway to the IFE security processing system 210.

In a further embodiment, the ground-based CSOC 100 operates to respond to identifying 408 the security event, by generating 414 a remedial security action command that instructs the IFE security processing system 210 to perform at least one of any of the following, which the CSOC 100 selectively indicates based on the remedial action rule:

1) deny access to a wireless access point by a PED 18 identified by the remedial security action command;
2) generate a notification through an interactive cabin management terminal which characterizes a security remedial action to be performed by a crew member;
3) block external communication access to a hardware interface port number, of the IFE security processing system, identified by the remedial security action command;
4) determine a passenger seat identifier associated with a security event identified by the remedial security action command, and generate an electronic notification containing the passenger seat identifier;
5) block communications by a PED 18 identified by the remedial security action command;
6) block communications by a display unit 42 identified by the remedial security action command;
7) block communications by a touch passenger media unit (remote controller 46) identified by the remedial security action command;
8) block communications by the interactive cabin management terminal identified by the remedial security action command;
9) block messages containing a characteristic identified by the remedial security action command, from being communicated through a cabin network; and 10) communicate the remedial security action command through the satellite communication pathway to the IFE security processing system 210.

Figure 8:
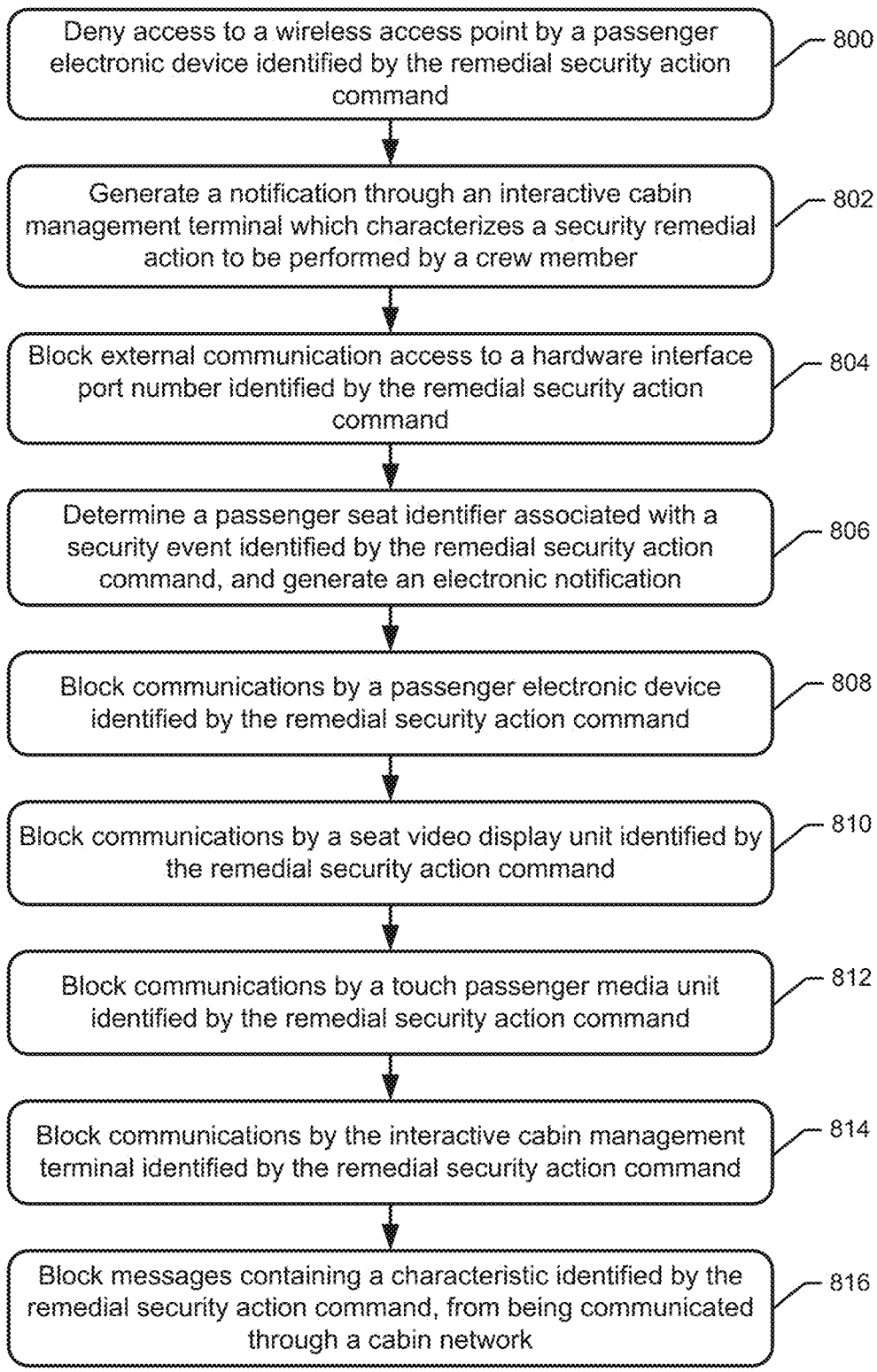

In a corresponding manner, the IFE security processing system 210 can receive 414 the remedial security action command from the ground-based cybersecurity operations center 100 through the satellite communication pathway, and perform 416 a remedial security action determined based on the remedial security action command. FIG. 8 illustrates a flowchart of operations by the IFE security processing system 210 to perform a remedial security action. Referring to FIG. 8, the remedial security action performed by the IFE security processing system 210 responsive to the remedial security action command, includes performing at least one of any of the following:

1) denying 800 access to a wireless access point by a PED 18 identified by the remedial security action command;
2) generating data to a notification through an interactive cabin management terminal which characterizes a security remedial action to be performed by a crew member;
3) blocking 804 external communication access to a hardware interface port number, of the IFE security processing system, identified by the remedial security action command;
4) determining 806 a passenger seat identifier associated with a security event identified by the remedial security action command, and generating an electronic notification containing the passenger seat identifier which can be communicated to the interactive cabin management terminal and/or another display device;
5) blocking 808 communications by a passenger electronic device identified by the remedial security action command;
6) blocking a 10 communications by a display unit 42 identified by the remedial security action command;
7) blocking a 12 communications by a touch passenger media unit identified by the remedial security action command;
8) blocking 814 communications by the interactive cabin management terminal identified by the remedial security action command; and
9) blocking 816 messages containing a characteristic identified by the remedial security action command, from being communicated through a cabin network.

Figure 5:
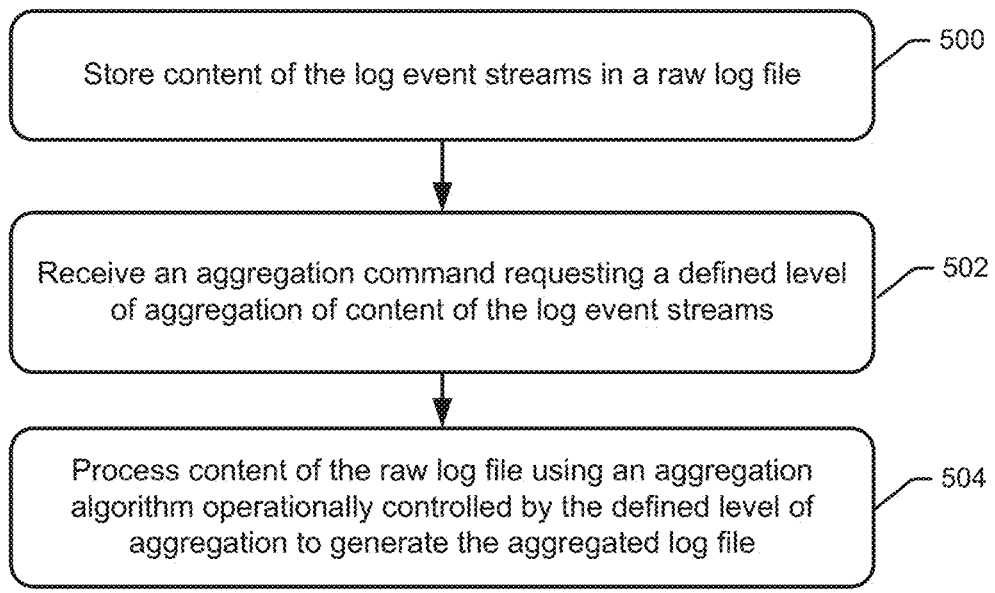
FIGS. 5-8 are flowcharts of operations that can be performed by the aircraft-based IFE security processing system in accordance with some embodiments of the present disclosure.

Some further embodiments are directed to the CSOC 100 controlling how the IFE security processing system 210 performs aggregation of content of a raw log file containing the log event streams to generate an aggregated log file. FIG. 5 is a flowchart of corresponding operations that can be performed by the IFE security processing system 210.

Referring to FIG. 5, the IFE security processing system 210 operates to store 500 content of the log event streams in a raw log file. The corresponding operation to aggregate content of the log event streams based on the level of aggregation set by aggregation commands received from the ground-based cybersecurity operations center, to generate an aggregated log file, includes to: receive 502 an aggregation command requesting a defined level of aggregation of content of the log event streams; and process 504 content of the raw log file using an aggregation algorithm operationally controlled by the defined level of aggregation to generate the aggregated log file. The level of aggregation may, for example, control how much content is aggregated together (e.g., combined in a statistical matter and what parameters are used by the statistical algorithms for the combining) to generate content for the aggregate log file. The IFE security processing system 210 may be configured with a default level of aggregation which can be overridden by received aggregation commands.

In a further embodiment, the aggregation command requests no level of aggregation of content of the log event streams for a defined length segment of the raw log file starting from a defined location in the raw log file. The operation to process 504 content of the raw log file using the aggregation algorithm operationally controlled by the defined level of aggregation to generate the aggregated log file, includes to extract the defined length segment of the raw log file starting from the defined location in the raw log file, and store the extracted defined length segment of the raw log file in the aggregated log file.

Figure 6:
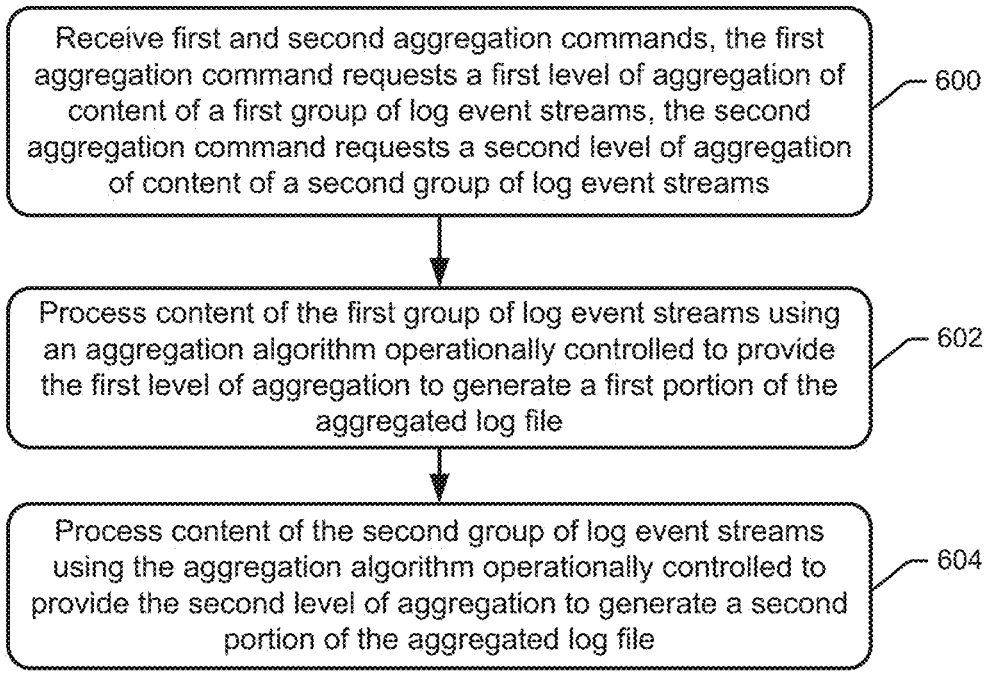

In further embodiment, the IFE security processing system 210 further operates to: identify one of the log event streams based on source information contained in the aggregation command; and process content of the raw log file that is only from the identified one of the log event streams, using the aggregation algorithm operationally controlled by the defined Some further embodiments are directed to the CSOC 100 controlling the level of aggregation used by the IFE security processing system to tend to aggregate content of the log event streams to generate an aggregated log file. FIG. 6 is a flowchart of corresponding operations performed by the IFE security processing system 210.

Referring to FIG. 6, the IFE security processing system 210 operates to aggregate content of the log event streams based on the level of aggregation set by aggregation commands received from the ground-based cybersecurity operations center, to generate an aggregated log file, includes to receive 600 first and second aggregation commands from the CSOC 100. The first aggregation command requests a first level of aggregation of content of a first group of log event streams. The second aggregation command requests a second level of aggregation of content of a second group of log event streams, where the first level of aggregation is different than the second level of aggregation. The operations process 602 content of the first group of log event streams using an aggregation algorithm operationally controlled to provide the first level of aggregation to generate a first portion of the aggregated log file. The operations process 604 content of the second group of log event streams using the aggregation algorithm operationally controlled to provide the second level of aggregation to generate a second portion of the aggregated log file. In this example, the reference to "first level of aggregation" may correspond to a level of aggregation that has been modified from a default level of aggregation for which the IFE security processing system 210 is configured to use by default.

In a further embodiment, the first level of aggregation operationally controls the aggregation algorithm to aggregate content over a first time interval of the first group of log event streams to provide the first level of aggregation when generating the first portion of the aggregated log file. Similarly, the second level of aggregation operationally controls the aggregation algorithm to process content over a second time interval of the second group of log event streams to provide the second level of aggregation when generating the second portion of the aggregated log file, where the first time interval has a shorter time duration than the second time interval.

In a further embodiment, the IFE security processing system 210 further operates to repetitively generate updated aggregated log files at a periodic rate that is controlled based on a rate command received from the ground-based cybersecurity operations center.

Figure 7:
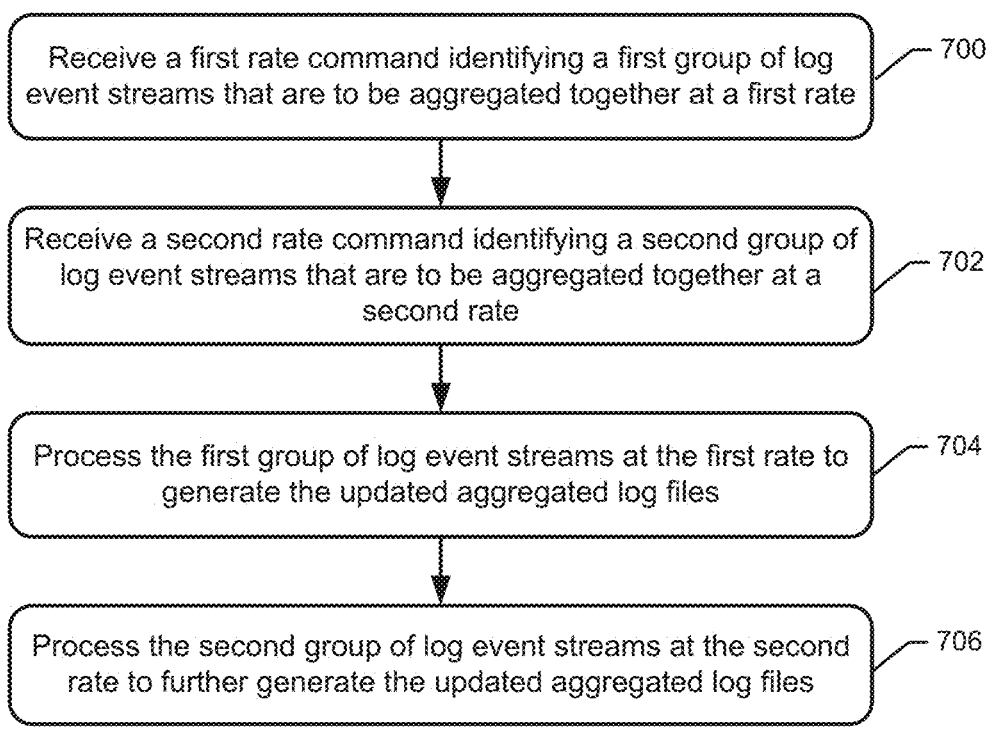

Some other embodiments are directed to the CSOC 100 controlling the rate at which the IFE security processing system 210 aggregates incoming log event streams to generate updated aggregation log files. FIG. 7 illustrates a flowchart of corresponding operations by the IFE security processing system 210.

Referring to FIG. 7, the IFE security processing system 210 operates to receive 700 a first rate command identifying a first group of log event streams that are to be aggregated together at a first rate. The operations receive 702 a second rate command identifying a second group of log event streams that are to be aggregated together at a second rate. The operations process 704 the first group of log event streams at the first rate to generate the updated aggregated log files. The operations process 706 the second group of log event streams at the second rate to further generate the updated aggregated log files. In this example, the reference to "first rate command" may correspond to a rate that has been modified from a default rate for which the IFE security processing system 210 is configured to use by default.

Further Definitions and Embodiments

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

What is claimed is:

1. An inflight entertainment (IFE) security processing system, comprising:
    at least one processor;
    at least one memory storing instructions executable by the at least one processor to perform operations comprising to:
        receive log event streams from components of an IFE system and/or connected to the IFE system;
        aggregate content of the log event streams based on a level of aggregation set by aggregation commands received from a ground-based cybersecurity operations center, to generate an aggregated log file; and
        communicate the aggregated log file through a satellite communication pathway to the ground-based cybersecurity operations center,
    store content of the log event streams in a raw log file;
        wherein the operation to aggregate content of the log event streams based on the level of aggregation set by aggregation commands received from the ground-based cybersecurity operations center, to generate an aggregated log file, comprises to:
            receive an aggregation command requesting a defined level of aggregation of content of the log event streams; and
            process content of the raw log file using an aggregation algorithm operationally controlled by the defined level of aggregation to generate the aggregated log file.

2. The IFE security processing system of claim 1, wherein the operations further comprise to:
    correlate content of the log event streams based on a correlation rule having parameters defined based on correlation commands received from the ground-based cybersecurity operations center.

3. The IFE security processing system of claim 2, wherein the operation to correlate content of the log event streams based on the correlation rule having parameters defined based on correlation commands received from the ground-based cybersecurity operations center, comprises to:
    correlate content of individual ones of the log event streams over a time interval that is defined by the correlation commands received from the ground-based cybersecurity operations center, to generate the aggregated log file with the correlated content.

4. The IFE security processing system of claim 3, wherein the operation to correlate content of individual ones of the log event streams over a time interval that is defined by the correlation commands received from the ground-based cybersecurity operations center, to generate the aggregated log file with the correlated content, comprises to:
    receive first and second correlation commands, wherein the first correlation command requests correlation of a first group of log event streams over a first time interval and the second correlation command requests correlation of content of a second group of log event streams, wherein the first time interval is different than the second time interval, wherein the first group of log event streams contains at least some different log event streams than the second group of log event streams;
    correlate content of individual ones of the log event streams in the first group over the first time interval; and
    correlate content of individual ones of the log event streams in the second group over the second time interval.

5. The IFE security processing system of claim 2, wherein the operation to correlate content of the log event streams based on the correlation rule having parameters defined based on correlation commands received from the ground-based cybersecurity operations center, comprises to:
    select a group of the log event streams which are identified by the correlation commands received from the ground-based cybersecurity operations center;
    correlate between content of the selected group of the log event streams to generate a correlation content file characterizing similarities and/or differences between the content of the selected group of the log event streams which are indicative of a cybersecurity event occurring; and
    communicate the correlated content file through the satellite communication pathway to the ground-based cybersecurity operations center.

6. The IFE security processing system of claim 1, wherein the components connected to the IFE system include at least one of:
    a network interface security unit;
    an interactive cabin management terminal;
    an aircraft data bus;
    a seat video display unit; and
    a touch passenger media unit.

7. The IFE security processing system of claim 1, wherein the streams are received from at least one of:
    a firewall;
    a network intrusion detection system;
    a role-based access control;
    a secure shell protocol; and
    an antivirus software.

8. The IFE security processing system of claim 1,
    wherein: the aggregation command requests no level of aggregation of content of the log event streams for a defined length segment of the raw log file starting from a defined location in the raw log file; and the operation to process content of the raw log file using the aggregation algorithm operationally controlled by the defined level of aggregation to generate the aggregated log file, comprises to extract the defined length segment of the raw log file starting from the defined location in the raw log file, and store the extracted defined length segment of the raw log file in the aggregated log file.

9. The IFE security processing system of claim 1, wherein the operations further comprise to: identify one of the log event streams based on source information contained in the aggregation command; and process content of the raw log file that is only from the identified one of the log event streams, using the aggregation algorithm operationally controlled by the defined level of aggregation to generate the aggregated log file.

10. The IFE security processing system of claim 1, wherein the operation to aggregate content of the log event streams based on the level of aggregation set by aggregation commands received from the ground-based cybersecurity operations center, to generate an aggregated log file, comprises to:
receive first and second aggregation commands, wherein the first aggregation command requests a first level of aggregation of content of a first group of log event streams, wherein the second aggregation command requests a second level of aggregation of content of a second group of log event streams, wherein the first level of aggregation is different than the second level of aggregation; and
process content of the first group of log event streams using an aggregation algorithm operationally controlled to provide the first level of aggregation to generate a first portion of the aggregated log file; and
process content of the second group of log event streams using the aggregation algorithm operationally controlled to provide the second level of aggregation to generate a second portion of the aggregated log file.

11. The IFE security processing system of claim 10, wherein:
the first level of aggregation operationally controls the aggregation algorithm to aggregate content over a first time interval of the first group of log event streams to provide the first level of aggregation when generating the first portion of the aggregated log file; and
the second level of aggregation operationally controls the aggregation algorithm to process content over a second time interval of the second group of log event streams to provide the second level of aggregation when generating the second portion of the aggregated log file,
wherein the first time interval has a shorter time duration than the second time interval.

12. The IFE security processing system of claim 1, wherein the operations further comprise to:
repetitively generate updated aggregated log files at a periodic rate that is controlled based on a rate command received from the ground-based cybersecurity operations center.

13. The IFE security processing system of claim 12, wherein the operations further comprise to:
receive a first rate command identifying a first group of log event streams that are to be aggregated together at a first rate;
receive a second rate command identifying a second group of log event streams that are to be aggregated together at a second rate;
process the first group of log event streams at the first rate to generate the updated aggregated log files; and
process the second group of log event streams at the second rate to further generate the updated aggregated log files.

14. The IFE security processing system of claim 1, wherein the operations further comprise to:
receive a remedial security action command from the ground-based cybersecurity operations center through the satellite communication pathway; and
perform a remedial security action determined based on the remedial security action command.

15. The IFE security processing system of claim 14, wherein the remedial security action comprises to perform at least one of:
deny access to a wireless access point by a passenger electronic device identified by the remedial security action command;
generate a notification through an interactive cabin management terminal which characterizes a security remedial action to be performed by a crew member;
block external communication access to a hardware interface port number, of the IFE security processing system, identified by the remedial security action command;
determine a passenger seat identifier associated with a security event identified by the remedial security action command, and generate an electronic notification containing the passenger seat identifier;
block communications by a passenger electronic device identified by the remedial security action command;
block communications by a seat video display unit identified by the remedial security action command;
block communications by a touch passenger media unit identified by the remedial security action command;
block communications by the interactive cabin management terminal identified by the remedial security action command; and
block messages containing a characteristic identified by the remedial security action command, from being communicated through a cabin network.

16. A ground-based cybersecurity operations center comprising:
at least one processor;
at least one memory storing instructions executable by the at least one processor to perform operations comprising to:
receive an aggregated log file through a satellite communication pathway from an inflight entertainment (IFE) security processing system;
process the aggregated log file to identify a security event satisfying at least one defined security rule;
responsive to identifying the security event, generate an aggregation command to control aggregation by the IFE security processing system of content of log event streams from components of an IFE system to generate an updated aggregated log file; and
communicate the aggregation command through the satellite communication pathway to the IFE security processing system.

17. The ground-based cybersecurity operations center of claim 16, wherein the operations further comprise to:
responsive to identifying the security event, determine a time interval over which the IFE security processing system is to perform periodic aggregation of content of the log event streams to generate updated aggregated log files; and
communicate the determined time interval in a correlation command that controls correlation by the IFE security processing system of content of individual ones of the log event streams, wherein the correlation rule is communicated through the satellite communication pathway to the IFE security processing system.

18. The ground-based cybersecurity operations center of claim 16, wherein the operations further comprise to:
responsive to identifying the security event, select a group of the log event streams in which the IFE security processing system is to perform aggregation of content to generate the updated aggregated log file; and communicate the selected group of the log event streams in a correlation command that controls correlation by the IFE security processing system of content of selected group of the log event streams, wherein the correlation rule is communicated through the satellite communication pathway to the IFE security processing system.

19. The ground-based cybersecurity operations center of claim 16, wherein the operations further comprise to:
responsive to identifying the security event, generate the aggregation command to request a defined level of aggregation of content of the log event streams by the IFE security processing system processing content of a raw log file using an aggregation algorithm operationally controlled by the defined level of aggregation to generate the updated aggregated log file; and
communicate the aggregation command through the satellite communication pathway to the IFE security processing system.

20. The ground-based cybersecurity operations center of claim 16, wherein the operations further comprise to:
responsive to identifying a first security event associated with a first group of log event streams that satisfies a first security rule, generate a first aggregation command requesting a first level of aggregation of content of a first group of log event streams by the IFE security processing system;
communicate the first aggregation command through the satellite communication pathway to the IFE security processing system;
following communication of the first aggregation command and responsive to identifying a second security event associated with a second group of log event streams that satisfies a second security rule, generate a second aggregation command requesting a second level of aggregation of content of a second group of log event streams by the IFE security processing system; and
communicate the second aggregation command through the satellite communication pathway to the IFE security processing system.

21. The ground-based cybersecurity operations center of claim 16, wherein the operations further comprise to:
responsive to identifying the security event, generate a remedial security action command that instructs the IFE security processing system to perform at least one of the following determined based on the remedial action rule:
deny access to a wireless access point by a passenger electronic device identified by the remedial security action command;
generate a notification through an interactive cabin management terminal which characterizes a security remedial action to be performed by a crew member;
block external communication access to a hardware interface port number, of the IFE security processing system, identified by the remedial security action command;
determine a passenger seat identifier associated with a security event identified by the remedial security action command, and generate an electronic notification containing the passenger seat identifier;
block communications by a passenger electronic device identified by the remedial security action command;
block communications by a seat video display unit identified by the remedial security action command;
block communications by a touch passenger media unit identified by the remedial security action command;
block communications by the interactive cabin management terminal identified by the remedial security action command;
block messages containing a characteristic identified by the remedial security action command, from being communicated through a cabin network; and
communicate the remedial security action command through the satellite communication pathway to the IFE security processing system.

\* \* \* \* \*